Oct. 9, 1951  J. HORNIK, SR  2,570,950
AUTOMATIC TEMPLET AND JIG
Filed July 27, 1949  3 Sheets-Sheet 2

Fig. 2.

INVENTOR.
Joseph Hornik, Sr.
BY Morsell & Morsell
ATTORNEYS.

Oct. 9, 1951  J. HORNIK, SR  2,570,950
AUTOMATIC TEMPLET AND JIG
Filed July 27, 1949  3 Sheets-Sheet 3

INVENTOR,
Joseph Hornik, Sr.
BY Morsell & Morsell
ATTORNEYS.

Patented Oct. 9, 1951

2,570,950

UNITED STATES PATENT OFFICE 2,570,950

AUTOMATIC TEMPLET AND JIG

Joseph Hornik, Sr., Milwaukee, Wis., assignor to Badger Wire & Iron Works, Inc., Milwaukee, Wis., a corporation of Wisconsin Application July 27, 1949, Serial No. 107,082

19 Claims. (Cl. 33—174)

This invention relates to improvements in automatic templets and jigs, for use in the manufacture of metal stairs.

The longitudinal supporting member extending the full length at each side of a metal stair is known as a stringer, and the stair treads are frequently supported on suitable angle irons which are welded or otherwise fixed to the inner surfaces of the stringers. The practice of laying out the stringers and properly positioning the angle irons thereon has heretofore been a time consuming and necessarily expensive operation.

In laying out the stringers, each step must be equally spaced from the step next adjacent. The number of steps to be supported by a pair of stringers of a given length is preselected. By common practice the spacings between adjacent steps are arrived at by using a pair of dividers, and by cut and try methods, the full length of the stringer is marked off until the desired number of equal spacings is obtained. The tread line and the rise line are then scribed on the stringer in accordance with the predetermined slope at which the stringers are to be installed. The tread line and the rise line for each step are scribed on the stringers with the use of a square. Sections of angle irons which have previously been formed into L-shaped members are then positioned on the stringers adjacent the scribe marks, and, with the scribe marks as positioning guides, said L-shaped members are welded to the stringers in their proper positions. Heretofore it has been impractical to use straight sections of angle iron for step supporting purposes.

It is a general object of this invention to provide an automatic templet whereby any selected number of equal spacings can be quickly arrived at on any length of stair stringer.

A further object of the invention is to provide an automatic templet with which any selected combination of normal stair tread and rise measurements can be quickly arrived at within each of a plurality of equal step spacings, said templet at all times maintaining the tread line at substantially a right angle from the rise line in each space.

A further object of the invention is to provide an automatic templet of the class described which also serves as a jig for the positioning of step supporting angle irons, thereby eliminating the need for scribing on the stringers and also permitting the use of relatively short straight sections of step supporting angle members in place of the preformed L-shaped type heretofore used.

A further object of the invention is to provide an automatic templet and jig of the class described which may be used for laying out and serving as a jig for both of the stringers of a metal stair, simultaneously.

A further object of the invention is to provide a device of the class described which is strong and durable, which is fast and efficient in operation and which is otherwise well adapted for the purposes described.

With the above and other objects in view, the invention consists of the improved automatic templet and jig, and all of its parts and combinations as set forth in the claims and all equivalents thereof.

In the drawings accompanying and forming a part of this specification, wherein is shown one complete embodiment of the preferred form of the invention, and wherein the same reference characters indicate the same parts in all of the views.

Figure 1:
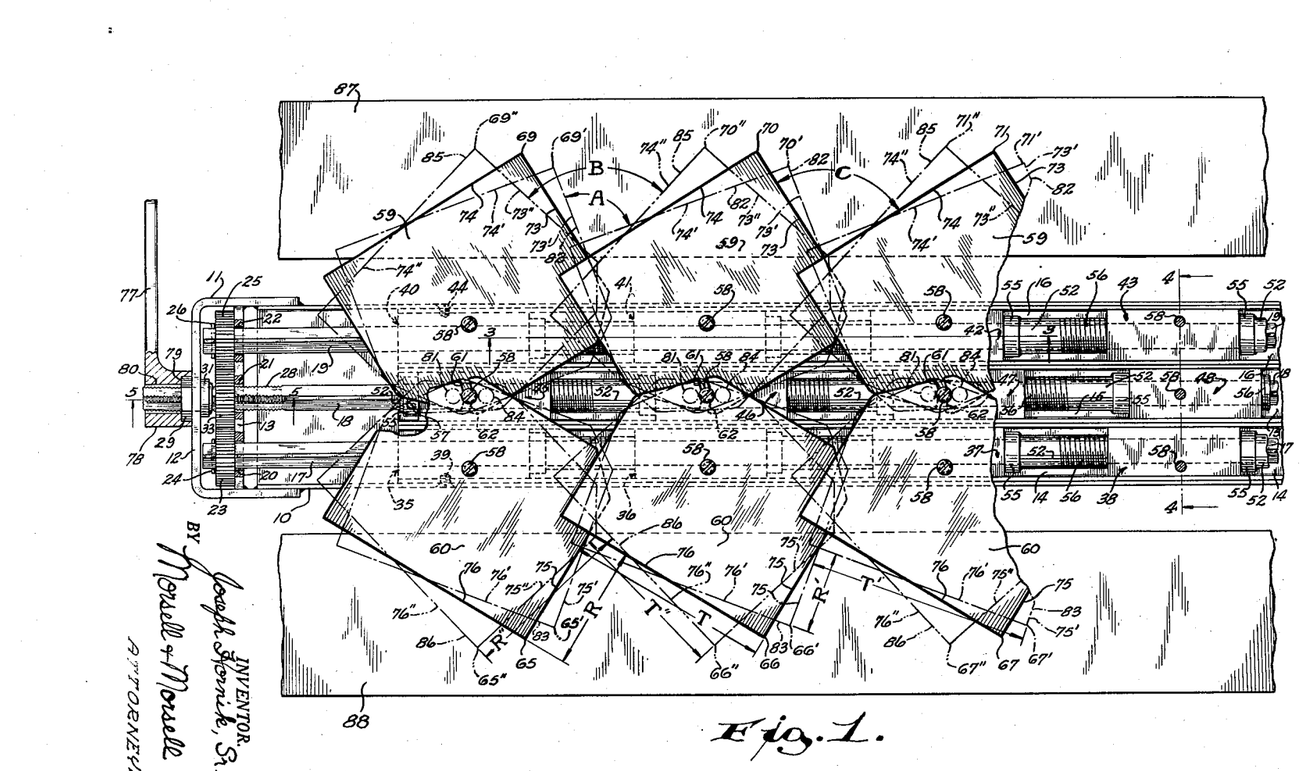
Fig. 1 is a fragmentary plan view of the improved templet and jig showing a pair of stringers associated therewith, parts being broken away for clarity, said view illustrating the relative rotative adjustment of the templets.

Referring to Fig. 1, numeral 10 indicates an elongated channel member which forms the main frame of the improved device. Fixed to one end of the channel 10 is a U-shaped yoke 11 having a transverse bar member 12 forming part thereof and having a transverse bar member 13 fixed thereto and extending parallel with the bar 12 between said bar and the adjacent end of the channel 10.

Positioned within the main frame channel 10 and extending longitudinally thereof are three juxtaposed guide channels 14, 15 and 16. The guide channels 14, 15 and 16 are suitably fixed within the frame 10 and have their open sides facing upwardly, as is the case with the main frame channel 10. Extending longitudinally of the device and positioned within the guide channels 14, 15 and 16 are square shafts numbered respectively 17, 18 and 19.

The transverse bar 13 is formed with three apertures therethrough 20, 21 and 22. One end of the square shaft 17 rotatably projects through the aperture 20 and has fixed thereon a gear 23 which may be held in place by a pin 24. An end of the square shaft 19 rotatably projects through the aperture 22 and has a gear 25 fixed thereon which may be held in place by a pin 26. The transverse bar 12 of the yoke 11 is formed with an aperture 27 therethrough (see Fig. 5) which is coaxial with the aperture 21 in the bar 13. An end of the square shaft 18 is formed with screw threads 28 and extends through the apertures 21 and 27 as shown.

Figures 4, 5, 6:
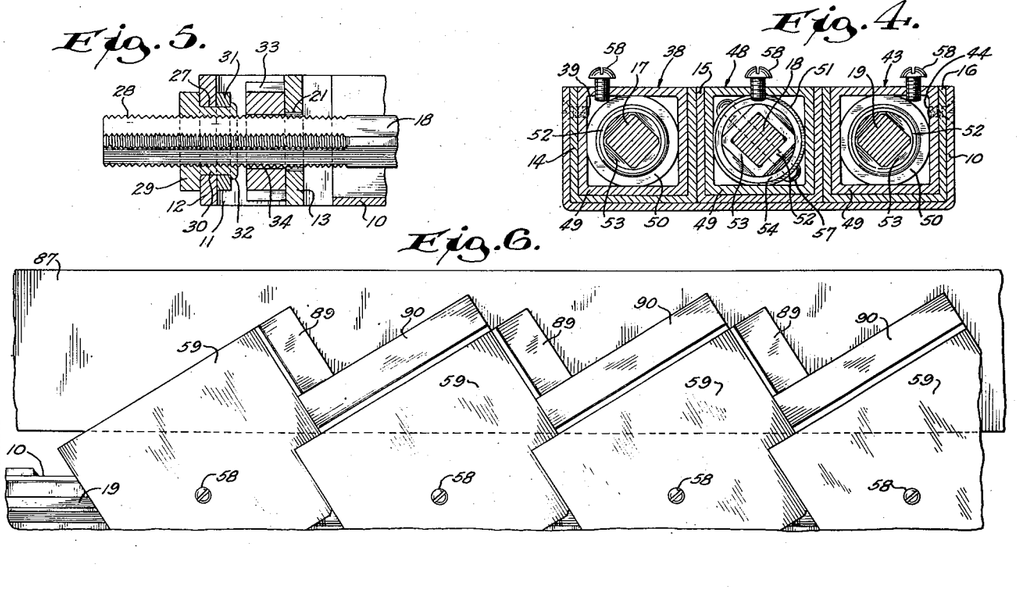
Fig. 4 is an enlarged transverse vertical sectional view taken along the line 4—4 of Fig. 1.
Fig. 5 is an enlarged fragmentary longitudinal sectional view taken approximately along the line 5—5 of Fig. 1.
Fig. 6 is a fragmentary plan view similar to Figs. 1 and 2 and showing the improved device serving as a jig.

Referring to Fig. 5, a nut 29 is threaded onto the threaded portion 28 of the rod 18 and has a portion of reduced diameter 30 which is rotatably positioned in the aperture 27 of the bar 12. A collar 31 is positioned on the portion 30 of the nut 29 adjacent the inner surface of the bar 12 and is suitably held in position on the portion 30, as by the outwardly projecting flange 32. The nut 29, therefore, is free to rotate in the aperture 27, but is prevented from any axial movement. As will be noted from Fig. 5, the aperture 21 is sufficiently large to permit both rotation and axial movement of the square shaft 18 therein. A gear 33 is formed with a square central aperture 34 and is positioned on the square shaft 18 between the nut 29 and the transverse bar 13. The square aperture 34 permits axial sliding movement of the square shaft 18 relative to the gear 33 but prevents rotative movemnt of said gear relative to said shaft.

Positioned in the guide channel 14 are a plurality of interconnected equally spaced block units, four of which are shown and which are indicated by the numerals 35, 36, 37 and 38. The square shaft 17 extends through all of the aforementioned block units in a manner to be hereinafter described. The block unit 35 is fixed in the position shown by a screw 39 extending through the side of the main frame 10 and of the guide channel 14 as shown in Figs. 1 and 4.

Positioned in the guide channel 16 are a plurality of equally spaced connected block units, four of which are shown and which are indicated by the numerals 40, 41, 42 and 43. The square shaft 19 extends through all of the block units in the guide channel 16 in a manner to be later described. The block unit 40 is fixed in the position shown by a screw 44 (see Figs. 1 and 4) which extends through the adjacent side of the frame channel 10 and of the guide channel 16.

Positioned in the guide channel 15 are a plurality of equally spaced connected block units, four of which are shown and which are designated by the numerals 45, 46, 47 and 48. The square shaft 18 extends through all of the block units in the guide channel 15 in a manner to be later described.

The longitudinal spacing between all adjacent block units is the same, and there are the same number of block units in each of the guide channels. All of the block units are preferably substantially identical. The block units in the guide channel 15 are reversed from those in the guide channels 14 and 16 for a purpose to be later described.

Figure 3:
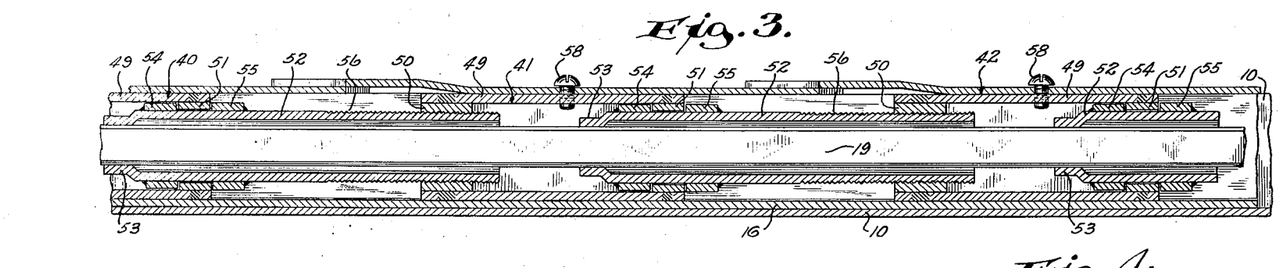
Fig. 3 is an enlarged fragmentary longitudinal vertical sectional view taken approximately along the line 3—3 of Fig. 1.

Referring to Fig. 3 wherein all or portions of the block units 40, 41 and 42 are shown in longitudinal vertical section, the structure of the individual block units will now be described. Each block unit has a preferably square tubular block 49, and, with the exception of the block units 35, 40 and 45, all of the block units are longitudinally and non-rotatably slidable in their respective guide channels. Fixed, as by welding, within one end of each block 49 is an internally threaded annular collar 50. Fixed, as by welding, within the opposite end of each of the blocks 49 is an annular unthreaded collar 51. A tubular member 52 rotatably extends through each of the unthreaded collars 51 and is formed at its inner end with a necked-down portion 53 which conforms to the shape of the square shaft 19 extending therethrough in a manner to permit relative axial sliding movement, but to prevent relative rotative movement. Fixed, as by welding, onto the exterior of each of the tubular members 52 inwardly adjacent the unthreaded collar 51 is an unthreaded annular collar 54. Fixed, as by welding, to the exterior of each of the tubular members 52 outwardly adjacent the annular collar 51 is an annular collar 55. The opposite end of each of the tubular members 52 is formed with external screw threads 56.

The threaded end portion 56 of the tubular member 52 of each of the block units is screwed into the internally threaded annular collar 50 of the next adjacent block unit as is clearly shown in Fig. 3. The tubular member 52 of each of the block units is rotatable relative to the block 49 of said unit, but it is prevented from axial movement relative thereto by the collars 51, 54 and 55. One of the square shafts extends through each of the block units, in the manner shown in Fig. 3, and rotation of said shaft causes like rotation of all of the tubular members 52 through which said shaft extends. This causes axial movement of the threaded collar 50 of each unit along the threaded portion of the tubular member 52 of the next adjacent unit with which said collar is threadedly engaged. Depending upon the direction of rotation of the square shaft, adjacent block units are moved either toward or away from each other. As this is done the necked-down portion 53 of each of the tubular members 52 slides along the square shaft which extends therethrough.

Referring to Fig. 1, it will be noted that the block units positioned in the center guide channel 15 are reversed from those in the guide channels 14 and 16. It will also be noted with reference to the block unit 45 in the guide channel 15, that a pin or bolt 57 extends diametrically through the collar 55 and the sleeve 52 thereof as well as through the square shaft 18, thereby fixing the block unit 45 longitudinally relative to said square shaft. It will also be noted that the tubular member 52 of the block unit 45 extends only a short distance outwardly from the collar 55 thereof. Rotation of the square shaft 18 and of the nut 29 in one direction causes simultaneous rotation of the shafts 17 and 19 in the opposite direction due to the intermeshing of the gears 23 and 25 with the gear 33. This rotation will cause the block units in all of the guide channels to be simultaneously and uniformly moved, in the manner previously described, either toward each other or away from each other, depending upon the direction of rotation of the shaft 18. Since the block units 35 and 40 are fixed longitudinally relative to the shafts 17 and 19 by the screws 39 and 44, respectively, and since the block unit 45 is fixed longitudinally relative to the square shaft 18 which cannot, during this operation, move longitudinally, all of the other block units in the device will move relative to these three longitudinally fixed block units.

The block member 49 of each of the block units is equally spaced from the block members 49 of the adjacent block units in the same guide channel, and the block members 49 are spaced substantially the same distance apart in all of the guide channels. It is apparent that if the block units in each guide channel are transversely alined, as shown in Figs. 1 and 2, rotation of the shaft 18 and of the nut 29 in the manner described causes adjacent block units in the same guide channels to move either toward or away from each other without disturbing the transverse alinement of block units in adjacent channels.

Referring to Figs. 1, 3 and 4, it will be noted that a screw 58 is threaded into the upper surface of the block member 49 of each of the block units. The screws 58 are substantially longitudinally centered on said block members, and with respect to the block members in the guide channel 15, said screws are also preferably transversely centered. With respect to the block members 49 in the channels 14 and 16, the screws 58 are preferably offset outwardly from the center line thereof. A plurality of preferably rectangular templets 59 are apertured to receive the screws 58 of the block units in the guide channel 16, and one of said templets is supported on each of said block units for pivotal movement about the screws 58 thereof as shown in Fig. 1. A similar plurality of templets 60 is apertured to receive the screws 58 of the block units in the guide channel 14, and each of said templets is mounted on one of said block units for pivotal movement about the screws 58 thereof. The templets 60 are slotted as at 61 to receive the screws 58 of the adjacent block units in the guide channel 15. The templets 59 are similarly slotted as at 62 to receive the screws 58 of the adjacent block units in the center guide channel 15, there being an overlapping relationship between portions of the templets 59 and 60 in engagement with the same screw 58.

Referring to Fig. 3, it will be noted that adjacent block units, upon proper rotation of the shaft extended therethrough, can move toward each other until the necked-down portion 53 of the tubular member 52 of one unit engages the end of the threaded portion 56 of the tubular portion 52 of the next adjacent unit. The maximum movement of adjacent block units away from each other is limited by the necessity of engagement of the collar 50 of one unit with the threaded portion 56 of the next adjacent unit.

Figure 2:
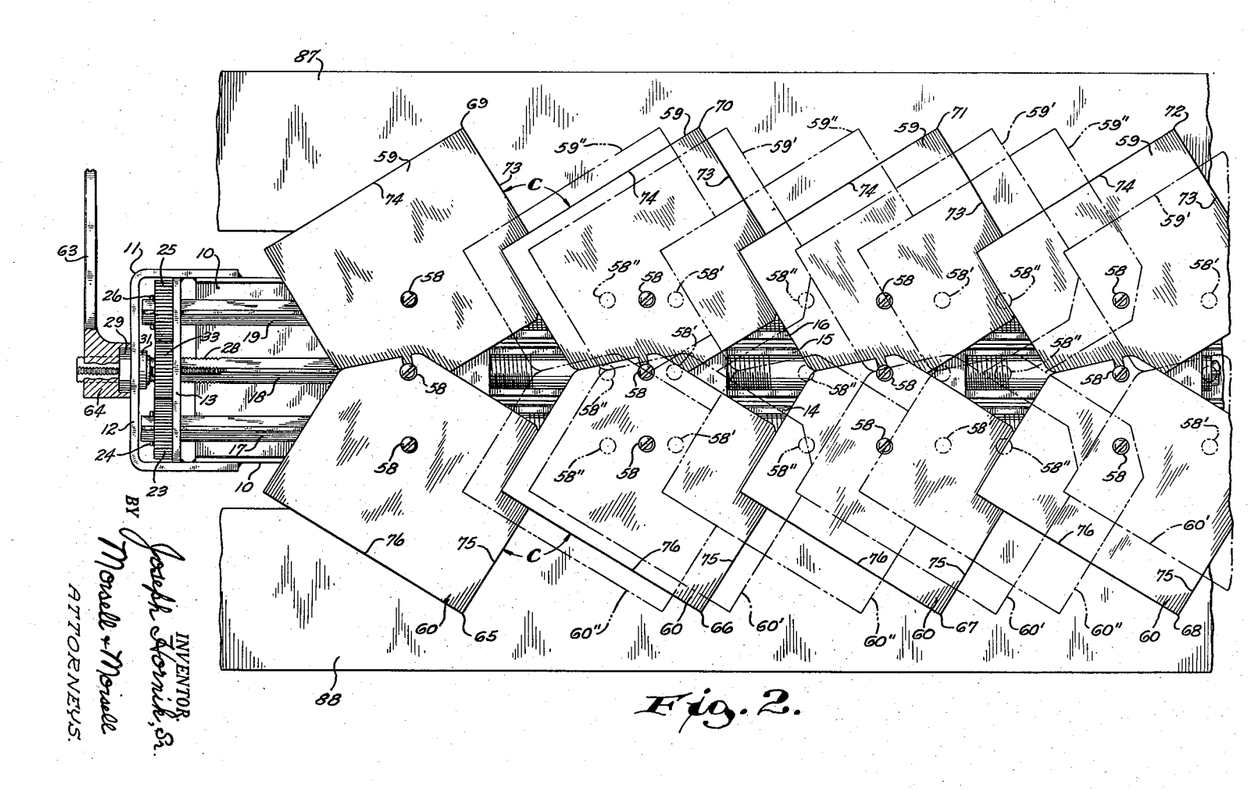
Fig. 2 is a fragmentary plan view similar to Fig. 1 showing the relative longitudinal adjustment of the templets.

Referring to Fig. 2, the solid line position of the templets 59 and 60 and of the block units on which they are positioned corresponds with the solid line position of said parts in Fig. 1. This position is an intermediate position. Fig. 2 shows a special wrench or crank 63 having a head 64 which engages the nut 29 and the outer end of the square shaft 18 simultaneously, so that when said crank is turned, both the nut 29 and the shaft 18 are rotated. This, of course, causes only rotative movement of the shaft 18.

When the crank 63 is rotated in a clockwise direction (when viewed from the left in Fig. 2), the shafts 17, 18 and 19 are rotated in the manner previously described, and all of the block units move apart at the same rate. Where the screws 58 of the transversely adjacent block units are transversely alined, as in Fig. 2, said screws maintain this transverse alinement as the block units move apart. The movable block units can be moved apart until the screws 58 thereof reach the position 58'. This movement places the templets 59 and 60, respectively, in the dot and dash line positions 59' and 60'.

When the crank 63 is turned in a counterclockwise direction, the movable block units can be moved together until the screws 58 of said block units reach the position 58''. In this position the templets 59 and 60 assume the positions 59'' and 60''. It is apparent, therefore, that the range of movement of the templets 59 and 60 is between the positions 59' and 59'' and 60' and 60'', respectively, as shown in Fig. 2. It is also apparent from the previous description of operation that regardless of the position of the templets 59 and 60 with respect to their total range of movement, the spacing between corresponding parts of adjacent templets is kept equal throughout all of the templets on the device during rotation of the crank 63. For example, the outer apexes 65, 66, 67 and 68 of the templets 60 remain equally spaced, regardless of whether the templets 60 are in their solid line positions or in any other positions between the positions 60' and 60''. The same holds true for the apexes 69, 70, 71 and 72 of the templets 59.

The templets 59 each have a forward outer edge 73 and a rear outer edge 74 which is disposed preferably at a right angle with respect to the edge 73. Similarly, the templets 60 each have a forward outer edge 75 and a rear outer edge 76 which extends preferably at a right angle to the edge 75. The pivotal mountings for the templets 59 are so located with respect to each of said templets that the forward outer edges 73 of all of the templets 59 are disposed at substantially right angles from the rear outer edges 74 of the next adjacent templet 59 as indicated by the letter C in Fig. 2. Similarly, the pivotal mountings for the templet 60 are so located that the forward outer edges 75 of said templets are disposed at substantially a right angle from the rear outer edges 76 of the templets next adjacent thereto as also shown by the letter C in Fig. 2. Movement of the templets 59 and 60 in response to rotation of the crank 63 does not change the angular relationship between the forward edges 73 and the rearward edges 74 of adjacent templets 59 or of the forward edges 75 and the rearward edges 76 of adjacent templets 60. This is because of the fact that rotation of the crank 63 does not cause rotative movement of the templets 59 and 60.

Referring to Fig. 1, a crank 77 is shown having a head 78 which is formed with a recess 79 adapted to coact with the nut 29. The head 78 is also formed with an aperture 80 which is adapted to fit loosely around the outer end of the shaft 18 without engaging said shaft. Rotation of the crank 77 in a clockwise direction, as viewed from the left in Fig. 1, causes like rotation of the nut 29 without causing rotation of the square shaft 18. This rotation of the nut 29 pulls the shaft 18 to the left as viewed in Fig. 1, causing the shaft 18 to slide axially in the gear 33 and through the aperture 21. Since the block unit 45 is connected to the square shaft 18 through the pin 57, and since all of the block units in any one guide channel are interconnected, movement of the shaft 18 to the left moves all of the block units in the center guide channel 15 to the left as one body.

Assuming that the shaft 18 is moved to the left sufficiently to move the screws 58 of the block units in the center guide channel 15 to the dot and dash positions 81, the templets 59, by said movement, are rotated about the screws 58 of the block units in the outer guide channel 16 in a clockwise direction to the position shown in dot and dash lines and indicated by the numeral 82. Simultaneously with this movement the templet 60 is rotated in a counterclockwise direction about the pivot screws 58 in the outer guide channels 14 to the positions shown in dot and dash lines and indicated by the numerals 83. The positions of the outer edges 73, 74, 75 and 76 of the templets 59 and 60 are indicated, in the rotated positions 82 and 83 thereof, by the numerals 73', 74', 75' and 76'. Since the edges 73 and 75 on any of the templets 59 and 60 are disposed at substantially a right angle to the edges 74 and 76 of adjacent templets 59 or 60, and since by movement of the shaft 18 all of the templets 59 and 60 are rotated an equal amount, it follows that the relationship between the edges 73' with respect to the adjacent edge 74' of the next adjacent templet 59 is that of substantially a right angle, as indicated by the letter A in Fig. 1. The same is true of the edge 75' of one of the templets 60 and the edge 76' of the next adjacent templet 60.

When the square shaft 18 is moved toward the right sufficiently to move the screws 58 of the center group of guide blocks to the positions 84, the templets 59 are rotated in a counterclockwise direction to the position 85, and the templets 60 are rotated in a clockwise direction to the position 86. In this position the edges 73, 74, 75 and 76 of the templets 59 and 60 are indicated by the numerals 73'', 74'', 75'' and 76''. Since all of the templets are rotated simultaneously an equal amount by movement of the shaft 18, the relationship of the edges 73'' and 75'' relative to the edges 74'' and 76'', respectively, of adjacent templets 59 and 60, is that of substantially a right angle and is indicated by the letter B in Fig. 1. It is apparent therefore that regardless of what position the templets 59 and 60 may be in as a result of axial movement of the center square shaft 18, the adjacent outer edges of adjacent templets at all times remain in the relationship of substantially a right angle relative to one another. This is clearly shown in Fig. 1, wherein the angles A, B and C are all substantially right angles. While the angles A, B and C in Fig. 1 are shown associated with the templets 59 only, it is apparent that the same relationship exists between corresponding portions of the templets 60.

When the templets 60 are in the solid line position shown in Fig. 1 and said templets are used in laying out a stair stringer, the distance between their outer apexes (such as the apexes 65, 66 and 67) and the edge 76 of the adjacent templet is the length of the rise of the stair to be laid out therewith and is indicated by the letter R. The distance from the apex of said templet to the outer edge 75 of the adjacent templet, is the length of the tread of the stair to be laid out, and is indicated by the letter T in Fig. 1. It will be noted that when the templets 60 were rotated to the position 83 shown in Fig. 1, the distance R decreased to the distance R'. Simultaneously the distance T increased to the distance T'. Upon rotating the templets 60 to the position 86, it will be noted that the distance R increased to the length indicated by the letter R'', whereas the distance T decreased to the length indicated by the letter T''. A corresponding relationship of parts exists with respect to the templets 59.

Upon movement of the square shaft 18 longitudinally to thereby cause rotation of the templets 59 and 60, it is apparent that the adjacent edges of adjacent templets are at all times maintained in substantially a right angular relationship. During rotation of the templets in the manner described, any normal combination of tread length and rise length can be obtained. Any tread length between that indicated by the letter T' and the letter T'' is obtainable, and simultaneously a corresponding rise length, which may be any length between R' and R'', is obtainable.

The improved device may be built with any desired number of templets 59 and 60, the number selected preferably being equal to the maximum number of steps which will be required in any stairway manufactured by the user. Suitable supporting means (not shown) may be provided along each side of the machine on which to position the stair stringers, such as the stringers 87 and 88. The support preferably positions the stringers immediately subjacent the portions of the templets 59 and 60 which project outwardly of the main frame 10.

In operation of the device, the length of the stair, as well as the number of steps to be provided in said stair, is predetermined. A pair of stringers, such as the stringers 87 and 88, having the predetermined length, are positioned on the supporting means immediately subjacent the templets 59 and 60 as shown in Figs. 1, 2 and 6. A number of the templets 59 and 60, equal to the predetermined number of steps to be provided in the stair, are then selected. The crank 63 (shown in Fig. 2) is then engaged with the end of the shaft 18 and with the nut 29, and said crank is turned until the selected number of templets are equally spaced along the predetermined length of the stringers 87 and 88. During this movement the apexes of the templets 59 and 60, such as the apexes 65, 66, 67, 69, 70 and 71, at all times maintain their equal spacing, regardless of whether they move toward or away from one another. The crank 63 is then removed, and the crank 77 is placed in engagement with the nut 29. The selected combination of tread distance and rise distance within the spaces previously arrived at by rotation of the crank 63, is obtained by rotation of the crank 77.

Referring to Fig. 6, it will be assumed that the templets 59 are positioned with their apexes at the desired equal spacing and that the selected combination of tread and rise distance has been arrived at in the manner previously described. With the improved device it is not necessary to in any way mark the tread and the rise distances on the stringers. Relatively short pieces of straight angle iron, such as the pieces 89 and 90, are placed on the stringers in engagement with the outer edges of the templets, as shown in Fig. 6. The outer edges of the templets serve as a jig for the positioning of the angle irons 89 and 90, and said angle irons are welded directly to the stringers while being so positioned by the templets. The angle irons 89 and 90 form stair tread supporting members which are positioned along the inner faces of both the stringers of the finished stairs. Because of the accurate positioning of the angle irons 89 and 90 by the templets, it is unnecessary to preform L-shaped angle members and to use said L-shaped members for stair supporting means. The improved device makes the use of the relatively short straight pieces of angle irons 89 and 90 entirely practical for this purpose.

It is apparent that the improved device automatically provides a selected number of equal spacings corresponding to the number of stairs desired for a given length stringer. The device also provides any selected combination of normal tread and rise lengths within said equal spacings. These two operations are quickly accomplished with the improved device, and upon arriving at the desired pattern, the device eliminates the need for scribing the stringers by serving as a jig for the positioning of the stair supporting angle members. The invention eliminates all cut and try operations of layout, and makes it possible for even an inexperienced person to accurately lay out a set of stair stringers.

Various changes and modifications may be made without departing from the spirit of the invention and all such changes are contemplated as may come within the scope of the claims.

What I claim is:

1. In a templet and jig assemblage, a plurality of equally spaced, alined, serially interconnected supporting units, said units each having a rotatable portion threadedly connected to an adjacent unit; a templet connected to each of said units; and means for causing simultaneous like rotation of the rotatable portion of each unit to uniformly vary the length of each of the spaces between said units while maintaining mutual equality of length of all of said spaces.

2. In a templet and jig assemblage, a plurality of equally spaced, alined, serially interconnected supporting units, said units each having a rotatable portion threadedly connected to an adjacent unit; a templet connected to each of said units; and means including a common shaft connected to the rotatable portion of each of said units for causing simultaneous like rotation of said rotatable portions to uniformly vary the length of each of the spaces between said units while maintaining mutual equality of length of all of said spaces.

3. In a templet and jig assemblage, a plurality of equally spaced, alined, serially interconnected supporting units, said units each having a rotatable portion threadedly connected to an adjacent unit; a templet connected to each of said supports; and means including a shaft extending within all of said units and non-rotatably connected to the rotatable portion of each of said units for causing simultaneous like rotation of said rotatable portions to uniformly vary the length of each of the spaces between said units while maintaining mutual equality of length of all of said spaces.

4. In a templet and jig assemblage, a plurality of equally spaced, alined, tubular supporting units, said units each having a rotatable portion threadedly connecting said unit with an adjacent unit and having a longitudinally movable but non-rotatable portion; a templet connected to the non-rotatable portion of each of said units; a common shaft projecting through all of said units and non-rotatably connected to the rotatable portion of each of said units; and means for rotating said shaft to cause simultaneous like rotation of said rotatable portions to uniformly vary the length of each of the spaces between said units while maintaining mutual equality of length of all of said spaces.

5. In a templet and jig assemblage, a first series of equally spaced alined supports; a templet pivotally connected to each of said supports for rotation on an axis normal to said templet, all of said axes being substantially parallel; a second series of equally spaced supports spaced from and parallel with said first supports, the spacing between said second supports being the same as that between the first supports; a templet pivotally connected to each of said second supports for rotation on an axis normal to said templet and parallel with the axes of rotation of said first-mentioned templets; means for simultaneously and uniformly varying the length of the spaces between adjacent supports in both the first and second series thereof while maintaining mutual equality of length of all of said spaces; and movable means connected to all of said templets for causing simultaneous identical rotation of the templets on said first supports in one direction and simultaneous identical rotation of the templets on the second supports in the opposite direction.

6. In a templet and jig assemblage, a pair of adjacent plates mounted for rotation on axes normal to said plates, the axis of rotation of one plate being substantially parallel to the axis of rotation of the other plate and each plate having an outer edge, said plates being positioned with the outer edge of one plate disposed at substantially a right angle from the outer edge of the other plate; and movable means connecting said plates in a manner to cause identical rotary movement of said plates in response to actuation of said movable means, whereby the outer edge of one of said plates is maintained at substantially a right angle to the outer edge of the other of said plates in all positions of movement of said movable means.

7. In a templet and jig assemblage, a pair of adjacent plates mounted for rotation on axes normal to said plates, the axis of rotation of one plate being substantially parallel to the axis of rotation of the other plate and each plate having an outer edge, said plates being positioned with the outer edge of one plate disposed at substantially a right angle from the outer edge of the other plate; movable means connecting said plates in a manner to cause identical rotary movement of said plates in response to actuation of said movable means, whereby the outer edge of one of said plates is maintained at substantially a right angle to the outer edge of the other of said plates in all positions of movement of said movable means; and means for selectively moving said movable means to cause rotation of said plates.

8. In a templet and jig assemblage, a first pair of adjacent plates, each plate being mounted for rotation on an axis normal thereto; a second pair of adjacent plates, each of said second plates being mounted for rotation on an axis normal thereto, the axes of rotation of all of said plates being substantially parallel, and the axes of rotation of said first pair of plates being positioned along a longitudinal axis parallel with the corresponding longitudinal axis of the second pair of plates, each of said plates having an outer edge and said plates being positioned so that the outer edge of each plate is disposed at substantially a right angle from the outer edge of the plate with which it forms one of said pairs; and common movable means pivotally connected to each of said first and second pair of plates in a manner to cause identical rotary movement of the plates of each pair in response to actuation of said movable means, whereby the outer edges of each of said pairs of plates are maintained at substantially a right angle with respect to each other in all positions of movement of said movable means.

9. In a templet and jig assemblage, a first pair of adjacent plates, each plate being mounted for rotation on an axis normal thereto; a second pair of adjacent plates, each of said second plates being mounted for rotation on an axis normal thereto, the axes of rotation of all of said plates being substantially parallel, and the axes of rotation of said first pair of plates being positioned along a longitudinal axis spaced from and parallel with the corresponding longitudinal axis of the second pair of plates, each of said plates having an outer edge and said plates being positioned so that the outer edge of each plate is disposed at substantially a right angle from the outer edge of the plate with which it forms one of said pairs; and common movable means pivotally connected to each of said first and second pair of plates between said longitudinal axes in a manner to cause identical rotary movement of the plates of each pair in response to actuation of said movable means, whereby the outer edges of each of said pairs of plates are maintained at substantially a right angle with respect to each other in all positions of movement of said movable means.

10. In a templet and jig assemblage, a pair of adjacent plates, each plate being mounted on a pivotal support for rotation on an axis normal to said plate, the axis of rotation of one plate being substantially parallel to the axis of rotation of the other plate and each plate having an outer edge, said plates being positioned with the outer edge of one plate disposed at substantially a right angle from the outer edge of the other plate; means for causing movement of said supports toward or away from each other; and extensible bodily movable means pivotally connected to said plates, said second means being interconnected with said first mentioned means to maintain the distance between the points of connection thereof with said templets equal to the distance between adjacent supports, and said second means being connected to said plates in a manner to cause identical rotary movement of said plates in response to non-extensible bodily movement of said second means, whereby the outer edge of one of said plates is maintained at substantially a right angle to the outer edge of the other of said plates in all positions of bodily movement of said second means.

11. In an automatic templet and jig assemblage, a plurality of equally spaced longitudinally alined supports; a templet pivotally connected to each of said supports for rotation on an axis normal to said templet, said axis being substantially parallel, said templets each having a pair of outer edges which are disposed angularly with respect to each other, and said templets being positioned so that an outer edge of one of any pair of adjacent templets is disposed at substantially a right angle from the adjacent outer edge of the other of said pair of templets; and common movable means pivotally connected to all of said templets in a manner to cause identical rotary movement of all of said templets in response to movement of said movable means, whereby an outer edge of one of any pair of adjacent templets is maintained at substantially a right angle to the adjacent outer edge of the other of said pair of templets in all positions of movement of said movable means.

12. In an automatic templet and jig assemblage, a plurality of equally spaced longitudinally alined supporting units; means for simultaneously and uniformly varying the length of the equal space between adjacent units; a templet pivotally connected to each of said units for rotation on an axis normal to said templet, said axes being substantially parallel, said templets each having a pair of outer edges which are disposed angularly with respect to each other, and said templets being positioned so that an outer edge of one of any pair of adjacent templets is disposed at substantially a right angle from the adjacent outer edge of the other of said pair of templets; and common, extensible, bodily-movable means pivotally connected to all of said templets, said second means being interconnected with said first mentioned means to maintain the distance between points of connection thereof with adjacent templets equal to the distance between adjacent units, and said second means being connected to said templets in a manner to cause identical rotary movement of said templets in response to non-extensible bodily movement of said second means, whereby an outer edge of one of any pair of adjacent templets is maintained at substantially a right angle to the adjacent outer edge of the other of said pair of templets in all positions of bodily-movement of said movable means.

13. In an automatic templet and jig assemblage, a first series of equally spaced longitudinally alined supporting units; a templet pivotally mounted on each of said units for rotation on an axis normal to said templet, said axes being substantially parallel, said templets each having a pair of outer edges which are disposed angularly with respect to each other, and said templets being positioned so that an outer edge of one of any pair of adjacent templets is disposed at substantially a right angle from the adjacent outer edge of the other of said pair of templets; a second series of longitudinally alined units which are longitudinally spaced apart identically with said first-mentioned units, said second units being spaced from said first-mentioned units and each of said second units being pivotally connected to one of said templets in a manner to cause identical rotary movement of all of said templets in response to an identical longitudinal movement of all of said second units; and means for causing simultaneous identical longitudinal movement of the units of said second series, whereby an outer edge of one of any pair of adjacent templets is maintained at substantially a right angle to the adjacent outer edge of the other of said pair of templets in all positions of identical longitudinal movement of said second series of units.

14. In an automatic templet and jig assemblage, a first series of equally spaced longitudinally alined supporting units; a templet pivotally mounted on each of said units for rotation on an axis normal to said templet, said axes being substantially parallel, said templets each having a pair of outer edges which are disposed angularly with respect to each other, and said templets being positioned so that an outer edge of one of any pair of adjacent templets is disposed at substantially a right angle from the adjacent outer edge of the other of said pair of templets; a second series of longitudinally alined units which are longitudinally spaced apart identically with said first-mentioned units, said second units being spaced from said first-mentioned units and each of said second units being pivotally connected to one of said templets in a manner to cause identical rotary movement of all of said templets in response to an identical longitudinal movement of all of said second units; means for causing simultaneous identical longitudinal movement of the units of said second series, whereby an outer edge of one of any pair of adjacent templets is maintained at substantially a right angle to the adjacent outer edge of the other of said pair of templets in all positions of identical longitudinal movement of said second series of units; and means for simultaneously and uniformly varying the length of the equal spaces between adjacent units in both said first and said second series.

15. In an automatic templet and jig assemblage, a first series of equally spaced longitudinally alined supporting units each having a rotatable portion threadedly connected to an adjacent unit in said first series; a templet pivotally mounted on each of said units for rotation on an axis normal to said unit, said axes being substantially parallel, said templets each having a pair of outer edges which are disposed angularly with respect to each other, and said templets being positioned so that an outer edge of one of any pair of adjacent templets is disposed at substantially a right angle from the adjacent outer edge of the other of said pair of templets; a second series of longitudinally alined units which are longitudinally spaced apart identically with said first-mentioned units, each of said second units having a rotatable portion threadedly connected to an adjacent unit in said second series, said second units being spaced from said first-mentioned units and each of said second units being pivotally connected to one of said templets in a manner to cause identical rotary movement of all of said templets in response to an identical longitudinal movement of all of said second units; means for longitudinally moving said interconnected second series of units as a body, whereby an outer edge of one of any pair of adjacent templets is maintained at substantially a right angle to the adjacent outer edge of the other of said pair of templets in all positions of bodily movement of said interconnected second series of units; and means for causing simultaneous rotation of the rotatable portion of each of said units to uniformly vary the length of the equal spaces between adjacent units in both said first and said second series thereof.

16. In an automatic templet and jig assemblage, a first series of equally spaced longitudinally alined supporting units each having a rotatable portion threadedly connected to an adjacent unit in said first series; a templet pivotally mounted on each of said units for rotation on an axis normal to said templets, said axes being substantially parallel, said templets each having a pair of outer edges which are disposed angularly with respect to each other and said templets being positioned so that an outer edge of one of any pair of adjacent templets is disposed at substantially a right angle from the adjacent outer edge of the other of said pair of templets; a second series of longitudinally alined units which are longitudinally spaced apart identically with said first-mentioned units, each of said second units having a rotatable portion threadedly connected to an adjacent unit in said second series, said second units being spaced from said first-mentioned units and each of said second units being pivotally connected to one of said templets in a manner to cause identical rotary movement of all of said templets in response to an identical longitudinal movement of all of said second units; means for longitudinally moving said interconnected second series of units as a body, whereby an outer edge of one of any pair of adjacent templets is maintained at substantially a right angle to the adjacent outer edge of the other of said pair of templets in all positions of bodily movement of said interconnected second series of units; and means including a pair of interconnected rotatable shafts each connected to the rotatable portions of the units of a separate one of said series of units for causing simultaneous and uniform variation in the length of the equal spaces between adjacent units in both said first and said second series thereof.

17. In an automatic templet and jig assemblage, a first series of equally spaced longitudinally alined supports; a second series of equally spaced supports alined on a longitudinal axis spaced from and parallel with the longitudinal axis of said first mentioned supports; a templet pivotally connected to each of said supports for rotation on an axis normal to said templets, said axes being substantially parallel, said templets each having a pair of outer edges which are disposed at substantially a right angle with respect to each other, and said templets being positioned so that an outer edge of one of any pair of adjacent templets in a series is disposed at substantially a right angle from the adjacent outer edge of the other of said pair of templets; and common movable means pivotally connected to all of said templets in a manner to cause identical rotary movement of all of the templets in each series in response to actuation of said movable means, whereby the outer edge of one of any pair of serially adjacent templets is maintained at substantially a right angle to the adjacent outer edge of the other of said pair of templets in all positions of movement of said movable means.

18. In a templet and jig assemblage; a first pair of adjacent plates, each plate being mounted for rotation on an axis normal thereto; a second pair of adjacent plates, each of said second plates being mounted for rotation on an axis normal thereto; the axes of rotation of all of said plates being substantially parallel, and the axes of rotation of said first pair of plates being positioned along a longitudinal axis parallel with the corresponding longitudinal axis of the second pair of plates, each of said plates having an outer edge and said plates being positioned so that the outer edge of each plate is disposed at substantially a right angle from the outer edge of the plate with which it forms one of said pairs, said plates also being positioned so that corresponding outer edges of the plates of both pair are disposed at the same angle from their longitudinal axes; and common movable means pivotally connected to each of said first and second pair of plates in a manner to cause identical rotary movement of the plates of each pair in response to actuation of said movable means, whereby the outer edges of each of said pairs of plates are maintained at substantially a right angle with respect to each other in all positions of movement of said movable means, and the corresponding outer edges of the plates of both pair are maintained at the same angle from said longitudinal axes.

19. In a templet and jig assemblage: a pair of adjacent plates mounted for rotation on axes normal to said plates, the axis of rotation of one plate being substantially parallel to the axis of rotation of the other plate and each plate having an outer edge, said plates being positioned with the outer edge of one plate disposed at a predetermined angularity with respect to the outer edge of the other plate; and movable means connecting said plates in a manner to cause identical rotary movement of said plates in response to actuation of said movable means, whereby the outer edge of one of said plates is maintained at said predetermined angularity with respect to the outer edge of the other of said plates in all positions of movement of said movable means.

JOSEPH HORNIK, Sr.

REFERENCES CITED

The following references are of record in the file of this patent:

UNITED STATES PATENTS

| Number | Name | Date |
| --- | --- | --- |
| 877,795 | McKenzie | Jan. 28, 1908 |